Jan. 20, 1931.  A. C. MATHEWSON  1,789,444
CITRUS FRUIT CRUSHING MILL
Filed Dec. 27, 1928    2 Sheets-Sheet 1

ALFRED C. MATHEWSON
INVENTOR

PER
Minier and Fiske
ATTORNEYS

Jan. 20, 1931.  A. C. MATHEWSON  1,789,444
CITRUS FRUIT CRUSHING MILL
Filed Dec. 27, 1928  2 Sheets-Sheet 2
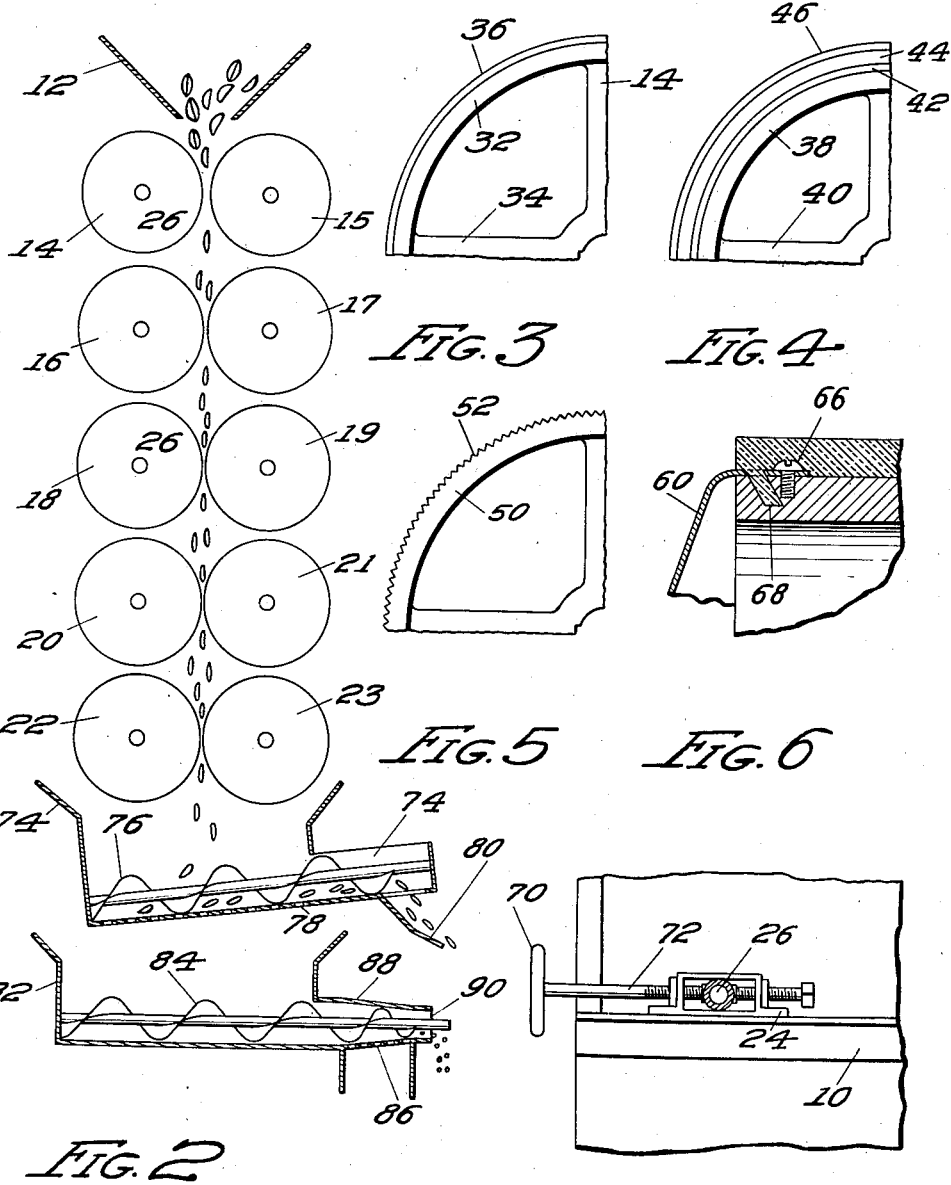

Patented Jan. 20, 1931

1,789,444

UNITED STATES PATENT OFFICE

ALFRED C. MATHEWSON, OF HUNTINGTON PARK, CALIFORNIA

CITRUS-FRUIT-CRUSHING MILL

Application filed December 27, 1928. Serial No. 328,731.

This invention relates to improvements in citrus fruit crushing mills, and has for one of its principal objects the provision of a machine which will extract the juice and pulp from citrus fruit without breaking the oil cells in the peel.

One of the important objects of this invention is to eliminate the hand labor heretofore considered necessary in extracting citrus fruit juice while at the same time segregating the juice, the pulp, the seeds, and peel so that separate use may be made of these various portions.

Still another important object of this invention is to provide a crushing mill for citrus fruit which will automatically extract the juice therefrom without contaminating the juice in any way either with the oil of the peel, or with any metal which might re-act with the acid of the juice.

Other and further important objects of the invention will be apparent from the disclosures in the accompanying drawings and following specification.

The invention, in a preferred form, is illustrated in the drawings and hereinafter more fully described.

In the drawings:

Figure 2 shows diagrammatically the operation of the machine.

Figure 3 is a quarter sectional view illustrating the details of construction of a fruit crushing roll used in the machine.

Figure 4 is a quarter sectional view illustrating the details of construction of the squeezing roll.

Figure 5 is a quarter sectional view illustrating the construction of the scouring rolls.

Figure 6 is a detail sectional view illustrating the method of application of a splasher to a roll.

Figure 7 is a detail view showing the means for lateral adjustment of the rollers.

As shown in the drawings:

Figure 1:
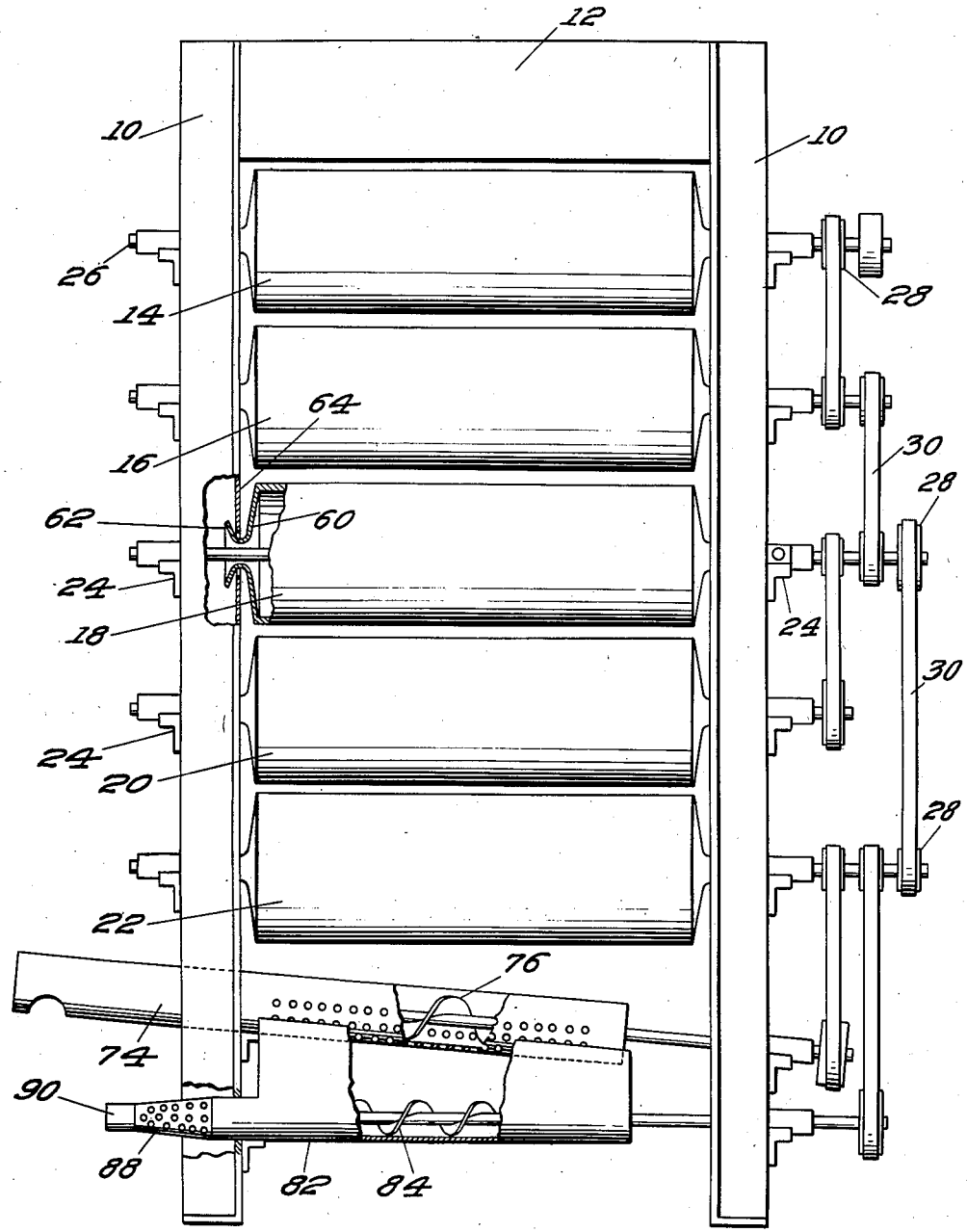
Figure 1 is a front vertical elevation of the improved citrus fruit grinding mill of this invention, parts being broken away and parts being shown in section.

The reference numeral 10 indicates generally the frame of the citrus fruit crushing mill of this invention, having a hopper 12 fastened at the top thereof into which quarter sections of fruit are thrown.

A plurality of rollers, preferably ten in number and designated by the reference numerals 14 to 23 inclusive, are mounted in suitable bearings 24 positioned in the frame of the machine, each of the bearings in turn supporting a roller-driving shaft 26 at one end of which is positioned a pulley or the like 28 by means of which the rolls are rotated, the pulleys being connected by means of belts or the like 30, and being of suitable sizes to control the relative rotative speeds of the rollers.

As best shown in Figure 3, the rollers 14 and 15 are hard rolls for crushing the fruit, and comprise cast iron cylindrical elements 32 including suitable integral spokes or the like 34, and applied to the outer surface of these cast iron cylinders is a smooth hard rubber jacket 36.

The construction of the rollers 16 to 19 inclusive is best shown in detail in Figure 4, each of these rollers comprising a cast iron cylinder 38, having integral spokes or the like 40, the cylinder, however, being smaller than the cylinder 32, and having applied to its outer surface the rubber binding 42. A coating of sponge rubber 44 is then applied to the rubber binding 42, being of approximately two or three times the thickness of the binding, and over this is mounted an outer covering or coating of hard rubber 46. It will be evident that pressure on these rollers will allow the sponge rubber to become compressed, thereby providing a certain amount of motion between the surfaces of two contiguous rollers of this sort, and between one of these rolls and the hard crushing roll.

Of the lowermost set of rollers 20 to 23 inclusive, two of these rollers as for example 21 and 22, are of the same construction as the rollers 16 to 19 inclusive as shown in Figure 4, and these soft rolls contact with and hold the peel side of the fruit while the pulp and seed is being acted on by the rolls 20 and 23.

The rolls 20 and 23 are composed of cast aluminum cylinders 50 as best shown in Figure 5, the same having corrugated faces as at 52. The pulley wheels driving these corrugated rolls are smaller than those driving the co-operating rolls, thereby causing the corrugated rolls to rotate at a greater rate of speed which results in the scouring of pulp from a quarter section of fruit, the juice of which has previously been extracted by the upper rolls. This scouring is accomplished by the corrugated face of the roller shown in Figure 5 which operates at a higher speed than its adjacent roller.

Two pairs of the soft squeezing rolls are provided, namely 16 to 19 inclusive, so that if the fruit falls between the rolls facing in one direction, the juice will be extracted therefrom by one set of rolls or the other, and two pairs of the combination scouring and squeezing rolls are provided as shown in 20 to 23 inclusive for this same reason, namely the scouring will take place at one set of rolls regardless of the position in which the fruit initially enters the sets of rolls.

In order to prevent the fruit juice from becoming dissipated and wasted in the event that it flows to the ends of the rolls, splashers are provided as best shown at 60 in Figures 1 and 6, these splashers being composed of some material which is impervious to the corrosive action of the acid fruit juice. All of the exposed supporting metal parts are also composed of such non-corrosive material.

The splashers 60 comprise disks attached to the ends of the rollers and with their center portions turned up as shown at 62 in Figure 1 to form a directing flange within which is fitted a splash plate as shown at 64, this also being constructed of non-corroding material and attached to an adjoining portion of the frame.

In the details shown in Figure 6, splasher 60 is attached to the metal portion of the roller by means of attaching screws as shown at 66, and a rubber coating for the roller is extruded past openings in the splasher, and into corresponding openings 68 in the material of the cylinder, this extrusion of rubber into the iron roller acting to permanently screw the parts together.

Each of the shafts 26 of every roller is mounted in a suitable adjustable bearing 24 best shown in Figure 7, the adjustment being accomplished by means of a hand wheel 70 mounted on a screw threaded shaft 72 whereby very accurate adjustments between the surfaces of any two co-acting rollers may be effectively accomplished.

The unused juice which reaches the ends of the rolls is deflected by the side plates 64, and the flanges 60, flows over the plates and past the grooves in the flanges dripping to the bottom of the mill where it is directed into a trough 74 having a conveyor 76 therein, and provided with a perforated bottom 78 through which the juice again drips. The conveyor, in turn, discharges the dry peel through a chute shown at 80, the openings in the screen 78 being sufficiently large to allow seeds to pass therethrough.

The juice, pulp, and the greater portion of the seeds are thereafter dropped into a further hopper 82, also having a conveyor 84 therein which discharges the juice and ground pulp through a screen 86 positioned at a constricted end 88 of the conveyor, and then finally discharges the remaining seeds through the opening 90.

It will be evident that herein is provided a citrus fruit juice extractor which will very efficiently and thoroughly separate such fruit into its component parts of peel, seeds, pulp, and juice, while at the same time eliminating practically all the hand labor heretofore considered necessary in these operations, and providing a much more sanitary, efficient, and consequently desirable operation. Further, any introduction of objectionable peel oil into the fruit juice is poistively eliminated.

I am aware that many changes may be made and numerous details of construction varied throughout a wide range without departing from the principles of this invention, and I therefore do not purpose limiting the patent granted herein otherwise than as necessitated by the prior art.

I claim as my invention:

1. A fruit juice extractor including in combination, a series of hard-surfaced crushing, soft-surfaced squeezing and pulp scouring rolls.

2. A fruit juice extractor including in combination, a series of hard-surfaced crushing, soft-surfaced squeezing and pulp scouring rolls, and additional means for segregating the peel, seeds, juice and pulp, said pulp-scouring rolls comprising co-operating pairs of soft-surfaced and hard, rough surfaced rolls respectively.

3. A fruit juice extractor including in combination, a series of hard-surfaced crushing, soft-surfaced squeezing and pulp scouring rolls, said scouring rolls comprising pairs of rollers, one roller of each pair rotating at a greater rate of speed than its component.

4. A fruit crushing mill comprising a hopper for quarter sections of fruit, a pair of crushing rolls beneath the hopper, a series of squeezing rolls beneath the crushing rolls, and a series of scouring rolls beneath the squeezing rolls, said scouring rolls operating in pairs, one of each pair provided with a soft peel holding face, and the other having a hard corrugated face and rotating at a higher speed than its component.

5. A method of extracting citrus fruit juices, comprising a preliminary quartering of the fruit, crushing the quarters, squeezing the same after crushing, and finally scouring the pulp from the peel.

6. A method of extracting citrus fruit juices, comprising a preliminary quartering of the fruit, crushing the quarters, squeezing the same after crushing, scouring the pulp from the peel, and finally segregating the peel, seeds, juice and pulp.

In testimony whereof I affix my signature.

ALFRED C. MATHEWSON.